US010137461B2

(12) United States Patent
Caldwell et al.

(10) Patent No.: US 10,137,461 B2
(45) Date of Patent: Nov. 27, 2018

(54) STATOR FOR FLOTATION MACHINES

(71) Applicant: FLSmidth A/S, Valby (DK)

(72) Inventors: Keri Caldwell, Midvale, UT (US); Timothy J. Olson, Draper, UT (US); Ronney Rogerio Rodrigues Silva, Draper, UT (US); Yihong Yang, Salt Lake City, UT (US); Donald J. Foreman, Hawkestone (CA)

(73) Assignee: FLSMIDTH A/S, Valby (DK)

( * ) Notice: Subject to any disclaimer, the term of this patent is extended or adjusted under 35 U.S.C. 154(b) by 381 days.

(21) Appl. No.: 14/440,225

(22) PCT Filed: Nov. 6, 2013

(86) PCT No.: PCT/DK2013/050359
§ 371 (c)(1),
(2) Date: May 1, 2015

(87) PCT Pub. No.: WO2014/071951
PCT Pub. Date: May 15, 2014

(65) Prior Publication Data
US 2015/0251192 A1 Sep. 10, 2015

(30) Foreign Application Priority Data
Nov. 9, 2012 (DK) ................................ 2012 70686

(51) Int. Cl.
*B03D 1/14* (2006.01)
*B03D 1/24* (2006.01)
(Continued)

(52) U.S. Cl.
CPC ............ *B03D 1/24* (2013.01); *B03D 1/1412* (2013.01); *B03D 1/22* (2013.01); *B03D 1/14* (2013.01); *B03D 1/1475* (2013.01); *B03D 1/16* (2013.01)

(58) Field of Classification Search
CPC .......... B03D 1/24; B03D 1/1412; B03D 1/22; B03D 1/14; B03D 1/1475
See application file for complete search history.

(56) References Cited

U.S. PATENT DOCUMENTS

| | | | | | |
|---|---|---|---|---|---|
| 180,415 | A * | 8/1876 | Clarke .................... | A01J 17/00 366/328.3 |
| 628,073 | A * | 7/1899 | Cornelius ................ | B01F 7/00 366/281 |

(Continued)

FOREIGN PATENT DOCUMENTS

| | | | |
|---|---|---|---|
| EP | 83103767.6 A2 | 11/1983 |
| EP | 88302972.0 A2 | 10/1988 |

(Continued)

OTHER PUBLICATIONS

International Search Report and Written Opinion dated Feb. 7, 2014, 9 pages.

*Primary Examiner* — Dung H Bui
(74) *Attorney, Agent, or Firm* — Jeffrey A. Sharp

(57) ABSTRACT

A flotation machine includes a stator positioned in a tank adjacent a rotor. The stator has a plurality of vanes. Each of the vanes has a plurality of slots formed therein. Each of the slots has a shape that is elongated in a direction along the width of the vane in which the slot is formed. Each of the vanes is spaced apart from the other vanes to which that vane is adjacent. The vanes are positioned in series adjacent a periphery of the stator to define a central opening within the stator that is sized such that the rotor of a flotation machine may be positioned therein. The stator may be retrofitted onto a prior flotation machine installation. For instance, a stator may be offered for sale and then installed onto a flotation machine. A previous stator may be removed before the installation of the new stator.

9 Claims, 11 Drawing Sheets

(51) Int. Cl.
*B03D 1/22* (2006.01)
*B03D 1/16* (2006.01)

(56) References Cited

U.S. PATENT DOCUMENTS 969,018 A * 8/1910 Willmann ............... F28F 13/12 137/340
1,070,728 A * 8/1913 Preston ................... B01F 7/166 366/296
1,719,973 A * 7/1929 Frates ................. A47J 43/1043 366/325.93
2,027,297 A * 1/1936 Tramposch ........... B01F 7/1695 366/254
2,572,375 A * 10/1951 Traugott ............... A47J 43/046 241/98
2,973,095 A * 2/1961 Sayers ..................... B03D 1/16 209/169
3,041,052 A * 6/1962 Dedoes ................. B01F 7/1695 220/324
3,158,359 A * 11/1964 Stiffler .................... B01F 7/003 416/231 A
3,161,404 A * 12/1964 Jay ......................... A23G 9/224 366/312
3,697,053 A * 10/1972 Will .................... B01F 7/00116 366/281
4,151,792 A * 5/1979 Nearhood ............. A47J 36/165 366/25
4,425,232 A * 1/1984 Lawrence ................ B03D 1/20 209/169
4,800,017 A * 1/1989 Krishnaswamy ........ B03D 1/20 209/169
5,205,926 A * 4/1993 Lawrence ............... B03B 11/00 209/168
5,533,805 A * 7/1996 Mandel ................. A47J 36/165 366/197
6,403,519 B1 * 6/2002 Francois .................. B01J 19/18 366/312
6,805,243 B1 * 10/2004 Kallioinen ............ B01F 3/0478 209/164
7,441,662 B2 * 10/2008 Ronkainen ........... B03D 1/1412 209/168
7,934,867 B2 * 5/2011 Yatomi ................... B01F 7/003 366/325.93
9,649,640 B2 * 5/2017 Peasley .................. B03D 1/028
2014/0001103 A1 * 1/2014 Yoon ........................ B03D 1/20 209/169
2015/0151309 A1 * 6/2015 Yoon ........................ B03D 1/16 209/169

FOREIGN PATENT DOCUMENTS

PL 64101 Y 11/2008
WO PCT/IB2011/55988 A2 7/2012

* cited by examiner

STATOR FOR FLOTATION MACHINES

CROSS REFERENCE TO RELATED APPLICATIONS

This application is a PCT international patent application which claims the benefit of Danish Priority Patent Application No. PA 2012 70686 filed on Nov. 9, 2012.

FIELD OF INVENTION

The present invention relates to flotation machines. More particularly, the present invention relates to stators that may be used in flotation machines and a method of retrofitting flotation machines to include a stator.

BACKGROUND OF THE INVENTION

Flotation machines are typically configured to retain a slurry, or pulp, within a tank. The slurry may include a material that is desired to be extracted from finely sized particles within the liquid of the slurry. The flotation machines are used to separate valuable material such as minerals from material having little or no value by means of changes in the surface chemistry of solid particles in a slurry so that certain particles become hydrophobic or hydrophilic. Examples of flotation machines may be appreciated from U.S. patent application Ser. No. 13/535,566, U.S. Pat. Nos.7, 441,662, 5,205,9264, 4,800,017, 4,425,232 and 2,973,095, International Publication Nos. WO 2011/069314 and WO 2011/066705 and Polish Patent No. 64101.

Often, flotation machines utilize a rotor positioned adjacent a stator. The rotor is rotated to agitate the slurry. Bubbles may be formed by agitation of the slurry and the feeding of air into the slurry to cause a froth to form above of the slurry. The hydrophobic particles will attach to the bubbles being carried to the top of the tank of the flotation cell where a froth is formed. The froth and particles suspended in the froth are collected by launders positioned adjacent to the top of the flotation cell.

In some designs, a type of gas such as air may be introduced into the slurry for the generation of bubbles and the formation of a froth. The air or other gas may be emitted so that the rotating rotor agitates the emitted gas along with the slurry to help generate a condition within the slurry to propagate the formation of froth above the slurry. U.S. Pat. No. 4,425,232 may provide one example of such a flotation machine design.

We have determined that it would be desirable to design a new flotation machine such that the stator, rotor, or both the rotor and stator of the flotation machine is configured to provide an improved recovery of material from retained slurry. We have determined that the improved recovery would also be preferably obtained while also reducing the cost of manufacture and the cost of operation associated with the flotation machine.

SUMMARY OF THE INVENTION

A flotation machine is provided that includes a tank that is sized to retain a slurry, a rotor, and a stator positioned in the tank adjacent the rotor. The stator has a plurality of vanes. Each of the vanes has a plurality of slots formed therein and also has a height and a width. Each of the slots is elongated in a direction along one of the width and height of the vane. Each of the vanes of the stator is spaced apart from the other vanes to which that vane is adjacent. The vanes are positioned in series adjacent a periphery of the stator to define a central opening within the stator. The rotor is positioned in the central opening of the stator. The rotor is rotatable within the central opening of the stator.

In some embodiments of the stator, all the slots are each elongated along the width of the vane in which that slot is formed. In alternative embodiments, all the slots are each elongated along the height of the vane. In one alternative embodiment, some slots in each vane are elongated along the height of the vane and other slots in that same vane are elongated along the width of that vane.

Some embodiments of the flotation machine may include a rotor that has openings through which at least one gas is emitted. The stator may also include a member that passes through each of the vanes and is connected to the vanes such that the member is aligned with the openings of the rotor. For instance, the member may be a ring shaped member or an annular member that is positioned to correspond with a vertical position of the openings of the rotor to divert a flow of the at least one gas emitted via the openings of the rotor to facilitate bubble generation within the slurry.

The slots of the vanes may be configured to permit a blocking member to be positionable in each of the slots. The blocking member may be sized to completely block the slot in which it is positioned or partially block that slot.

Embodiments of the flotation machine may include a rotor that has any number of blades such as eight blades, sixteen blades, thirty-two blades or sixty-four blades. Additionally, the stator may have any of a number of vanes such as eight vanes, sixteen vanes, thirty-two vanes or sixty-four vanes. In some embodiments, the number of vanes of the stator is the same number as the number of blades of the rotor (e.g. the rotor has eight blades and the stator has eight vanes). In other embodiments, the stator may have more vanes or fewer vanes than the rotor has blades (e.g. the rotor has eight blades and the stator has sixteen vanes).

The vanes of the stator may have any of a number of different shapes. For instance, each vane may be rectangular in shape, may have an inner side that is curved and an outer side that is curved. Each vane of the stator may be tapered be positioned to extend upwardly at an angle or at a diagonal orientation. In one embodiment, the inner side of each vane may be curved and extend along a curved path defined by a first formula and have an outer side that is curved and extends along a curved path defined by a second formula.

Embodiments of the stator may also include one or more annular members that are attached to each of the vanes and extends through each of the vanes. The annular member may be positioned between the top and bottom of each vane. In some embodiments, the annular member may be positioned so that it is level or substantially level. In one embodiment, the annular member may be a ring that is positioned to correspond with a vertical position of the outlets of the rotor through which a gas such as air is emitted. The ring may be positioned to divert the flow of air emitted from the rotor to help generate bubbles.

In another embodiment of the flotation machine, the flotation machine includes a tank that is sized to retain a slurry, a rotor, and a stator positioned in the tank adjacent the rotor. The stator has a plurality of vanes and an annular member attached to each of the vanes. Each of the vanes of the stator is spaced apart from the other vanes to which that vane is adjacent. The vanes are positioned in series adjacent a periphery of the stator to define a central opening within the stator. The annular member may be positioned between the top and bottom of each vane and may be positioned to correspond with a vertical position of outlets of the rotor through which a gas is emitted to divert the flow of the gas emitted from the rotor to help generate bubbles. The rotor is positioned in the central opening of the stator. The rotor is rotatable within the central opening of the stator. In some embodiments, the annular member may be integrally attached to the vanes via welding or other integral attachment mechanism and the vanes of the stator do not have any openings or slots.

In some embodiments of the flotation machine, the vanes of the stator each have an outer edge that is curved, the curvature of the outer edge defined by a formula. The formula is $y=-5.5227*x^4+11.593*x^3-9.7782*x^2+3.8897*x+0.3919$. The formula is in a normalized form to account for a maximum radius of the stator, x is the width of the vane and y is the height of the vane. The x parameter has a value of between 0.136 and 0.794 and the maximum radius of the stator is a maximum width of the stator from a center of the central opening defined by the stator to an outermost point of the outer edge of the vane.

In some embodiments of the flotation machine, the vanes of the stator may each have an inner edge that is curved as well. The curve of the inner edge may be defined by the formula $y=102.4*x^6-347.24*x^5+460.14*x^4-303.06*x^3+101.99*x^2-15.425*x+1.2008$, where x is the width of the vane and y is the height of the vane and x has a value of between 0.136 to 0.771 and the formula is in normalized form based on the maximum radius of the stator. It should be understood that the maximum radius of the stator is the maximum width of the stator from the center of the central opening defined by the stator to the outermost point of the outer side or outer edge of a vane.

An embodiment of the flotation machine is also provided that utilizes a stator with vanes that may not include any slots. For instance, a flotation machine may include a tank sized to retain a slurry and a stator positioned in the tank adjacent a rotor. The stator has a plurality of vanes. Each of the vanes has a height and a width. Each of the vanes of the stator is spaced apart from the other vanes to which that vane is adjacent. The vanes are positioned in series adjacent a periphery of the stator to define a central opening within the stator. The rotor is positioned in the central opening. The rotor is rotatable within the central opening of the stator and has openings through which at least one gas is emitted. An annular member is attached to each of the vanes of the stator. The annular member is positioned at a vertical location that corresponds with positions of the openings of the rotor to divert a flow of the at least one gas emitted via the openings of the rotor to facilitate bubble generation within the slurry. It should be understood that the vanes of the stator for this embodiment may not have any slots or other apertures through which the slurry or bubbles may pass. The vanes may instead be solid structures through which the annular member passes.

A method of retrofitting a stator on to a flotation machine is also provided. The method includes the step of offering a first stator for a flotation machine that is positionable in a tank of the flotation machine adjacent a rotor of the flotation machine. The first stator has a plurality of vanes. Each of the vanes has a plurality of slots formed therein and has a height and a width. Each of the slots has a shape that is elongated in a direction along one of the width of the vane and the height of the vane. Each of the vanes of the first stator is spaced apart from the other vanes to which that vane is adjacent. The vanes are positioned in series adjacent a periphery of the first stator to define a central opening within the first stator. The central opening is sized and configured to retain the rotor of the flotation machine. The method also includes the steps of installing the first stator on the flotation machine such that the first stator is positioned in the tank.

In some embodiments of the method, the method may also include removing a second stator of the flotation machine prior to installing the first stator.

In one embodiment, each of the slots may be sized and configured so that a blocking member is positionable within the slot to at least partially block the slot. At least one blocking member may then be positioned in at least one of the slots of at least one of the vanes.

In another embodiment, the method may include the step of modifying at least one slot to change the shape of that at least one slot for each vane of the first stator.

In some embodiments of the method, the flotation machine may include a rotor. The method may include the steps of removing the rotor from the flotation machine prior to installation of the first stator and installing a new rotor onto the flotation machine such that the new rotor is positioned within the central opening of the first stator such that the new rotor is rotatable within the tank of the flotation machine and within the central opening of the first stator after the new rotor and first stator are installed. In some embodiments, the new rotor may have at least eight blades and the first stator may have at least eight vanes.

Other details, objects, and advantages of the invention will become apparent as the following description of certain present preferred embodiments thereof and certain present preferred methods of practicing the same proceeds.

BRIEF DESCRIPTION OF THE DRAWINGS

Present preferred flotation machines, stators, and rotors used therein are shown in the accompanying drawings and certain present preferred methods of practicing the same are also illustrated therein. It should be understood that like reference numbers used in the drawings may identify like components.

DETAILED DESCRIPTION OF EXEMPLARY EMBODIMENTS

Figure 1:
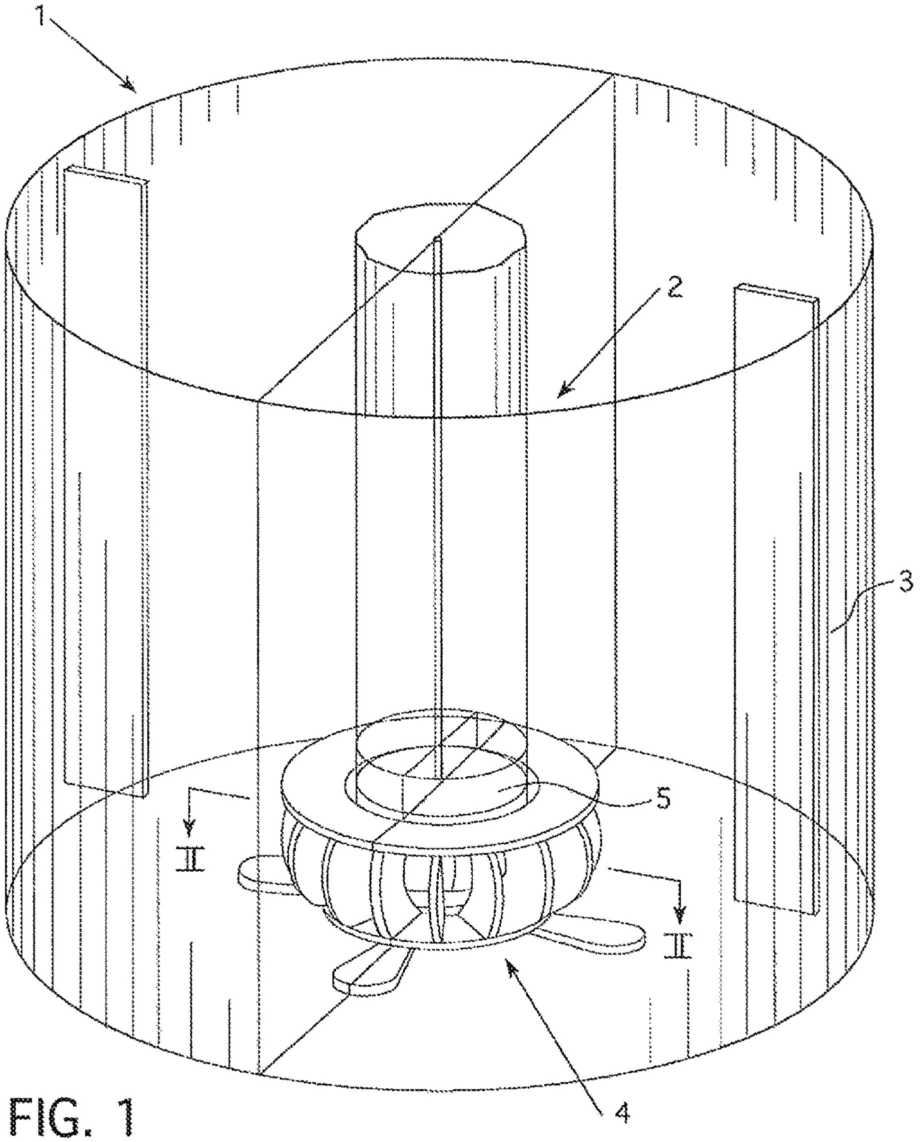
FIG. 1 is a fragmentary view of an exemplary embodiment of a flotation machine. It should be understood that a portion of the agitation assembly used to drive rotation of the rotor is cut away.

Referring to FIGS. 1-4, a flotation machine 1 may include an agitation mechanism 2 that may include a rotor 5 that is rotated via a drive system. The rotor 5 may have a plurality of blades and be rotated within a central opening defined by a stator 4. The stator 4 may be affixed to the floor 3*a* of the tank 3 or may be otherwise positioned in the tank 3 such that the rotor 5 is rotatable relative to the stator 4 to agitate slurry retained in the tank 3. The rotor 5 may also dissipate the air or other type of gas that is introduced into the tank via one or more apertures formed in the rotor 5, stator 4 or both the stator and rotor. The tank may retain a slurry, or pulp, which may include a liquid along with solid particulates that contain a desired material to which an operator of the flotation machine may want to extract or recover. The agitation of the slurry and gas may be configured to generate bubbles for forming a froth above the slurry. The bubbles that are generated by the agitation caused by the rotating rotor may attach to hydrophobic particles within the slurry. The bubbles may carry those attached particles to a froth zone formed on the top of the floatation machine located above the slurry so that the particulates may be recovered from the slurry such as via one or more launders or other types of particulate extraction devices, particulate removal devices, or froth extraction devices positioned adjacent to the tank.

It should be understood that the flotation machine 1 may include one cell having just one tank or may include a plurality of cells defined by a plurality of tanks. Each cell of the flotation machine may have a tank 3, a rotor 5, a drive system for rotating the rotor 5, and a stator 4.

The structure of the stator 4 that can be used in embodiments of the flotation machine may be best appreciated from FIGS. 2-6A. The stator 4 includes a base 9 that is affixed to the floor 3*a* of the tank 3 via fasteners such as bolts, rivets, or other attachment devices. A plurality of vanes 7 may extend from the base 9 of the stator to a top of the stator. The top of the stator may be a ring element such as a ring, a polygonal shaped annular structure or other annular top member 17 that may be connected to the top of each of the vanes 7.

The vanes 7 may be arranged in series adjacent a periphery of the stator 4 to define a central opening 10 sized to receive a rotor 5 so that a rotor positioned in the central opening may rotate to agitate fluid within the tank 3. The vanes 7 may be spaced apart from each other so that there is a gap between adjacent vanes. For example, the vanes 7 are positioned in series and vanes 7*e*, 7*f* and 7*g* are positioned so that vane 7*f* is immediately adjacent vane 7*e* and vane 7*g*. There is a gap or other space defined between vane 7*e* and vane 7*f* and a gap or other space defined between vane 7*f* and vane 7*g* due to the positioning of the vanes 7 of the stator 4. The spacing between each pair of immediately adjacent vanes 7 may be the same or may differ as desired to meet a particular design objective such as a desired fluid flow profile within the tank caused via rotation of a rotor 5 located within the central opening defined by the stator 4.

The vanes 7 may each have a plurality of slots 11 formed therein. The slots 11, which are illustrated in broken line, may be elongated along a width W of the vane. Alternatively, it is contemplated that the slots 11 may be elongated vertically along a height H of the vane. In one embodiment, the slots 11 of the vanes 7 are only positioned in an upper half of the height H of each vane.

While the slots 11 are illustrated as being rectangular in shape in FIGS. 1-6A, it should be understood that the slots 11 may have any of a number of other types of elongated shapes such as oval shapes, trapezoidal shapes, half-oval shapes, half-circle shapes, or elongated polygonal shapes.

Each of the slots 11 may be defined so that a blocking member is positionable in the slots so that the slot configuration of a fabricated vane may be adjusted to customize that vane for a particular installation. Such a feature can permit a standard vane to be used in designs utilized for stators that are customized for a particular application via use of one or more blocking members being attached to the vanes within certain slots 11.

Alternatively, it is contemplated that a moveable member may be attached to each vane 7. The moveable member may be moveable from an open position to a closed position so that the moveable member may be moved to partially block or fully block one or more of the vanes. It is contemplated that the moveable member may be actuated for movement via an actuation mechanism connected to a controller so that the vanes may have a different slot configuration at different times during mineral extraction processing. Alternatively, the moveable member may be manually moved from an open position to a closed position during an installation of the stator. A lock mechanism may also be connected to each vane to lock the position of the moveable member after it is moved to a closed position that partially blocks at least one of the slots 11 or fully blocks one or more of the slots 11.

Figure 2:
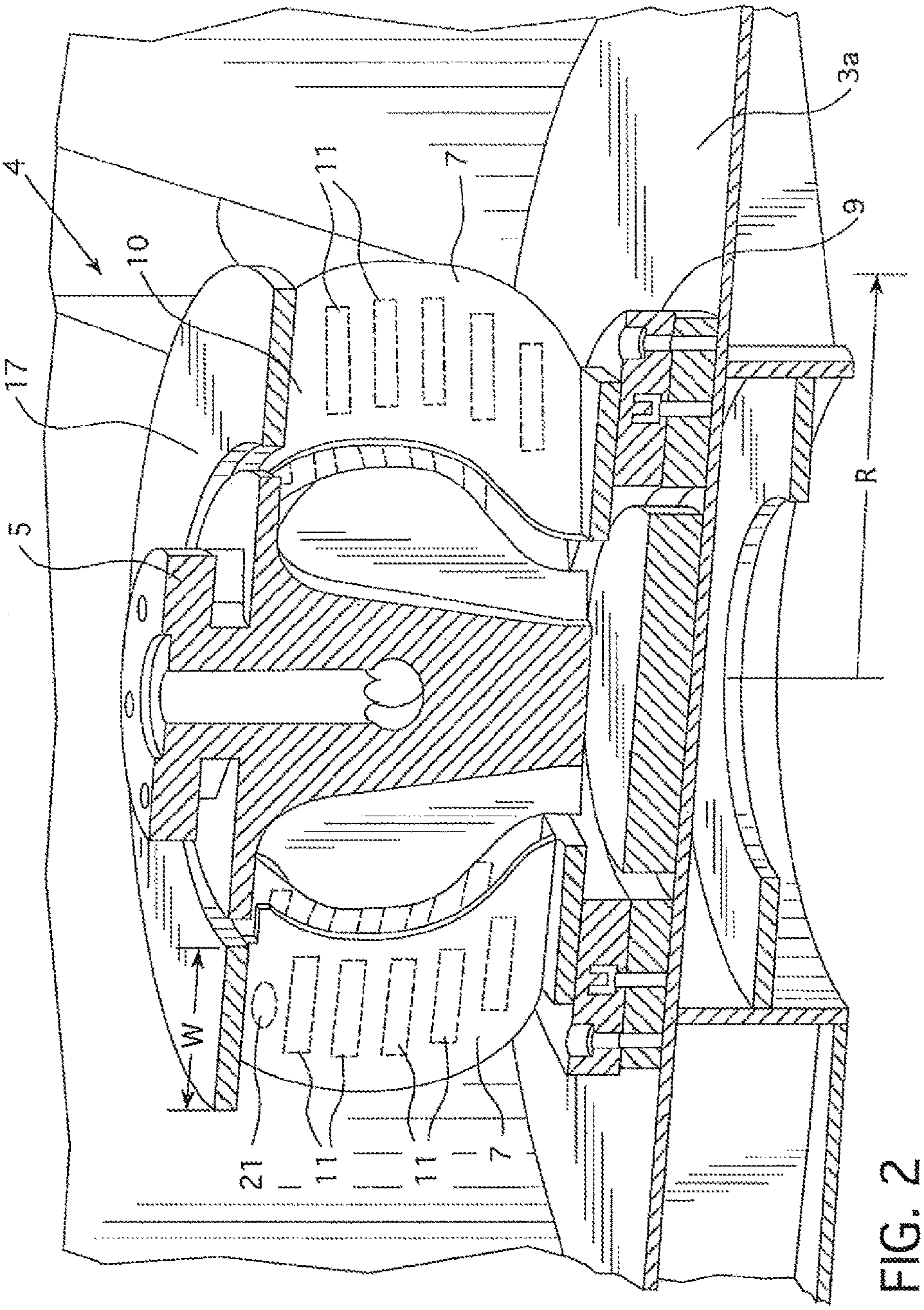
FIG. 2 is perspective cross sectional view taken along line II-II in FIG. 1 of a first exemplary embodiment of a stator that may be used in the flotation machine shown in FIG. 1.
Figure 3:
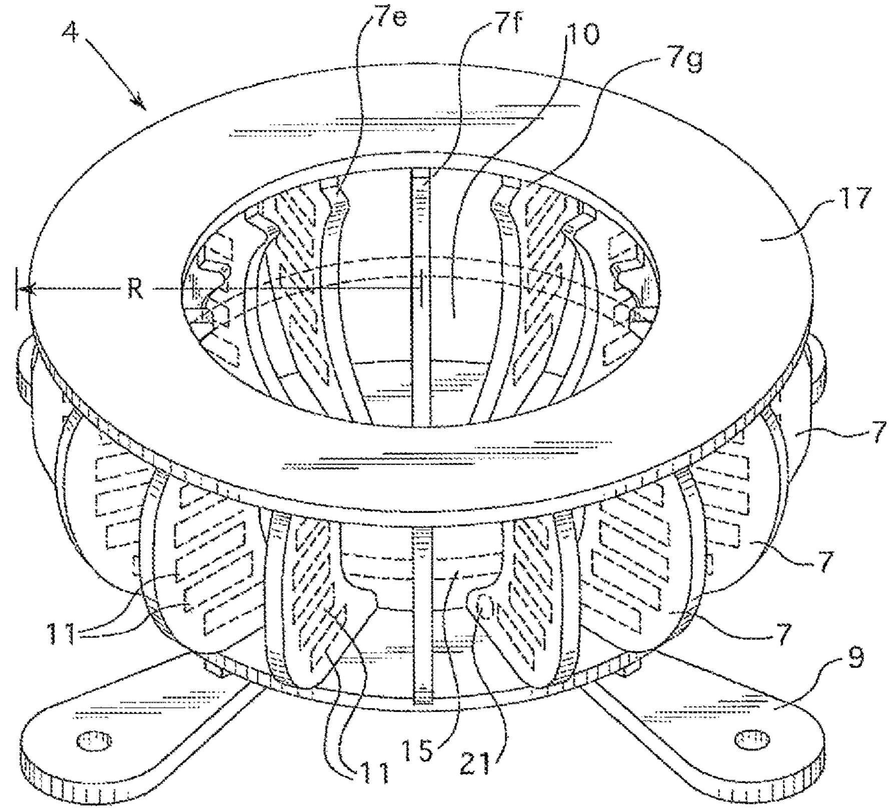
FIG. 3 is a perspective view of the first exemplary embodiment of the stator. It should be understood that an optional ring that may be used to reduce pitting is also illustrated in broken line in FIG. 3.
Figure 4:
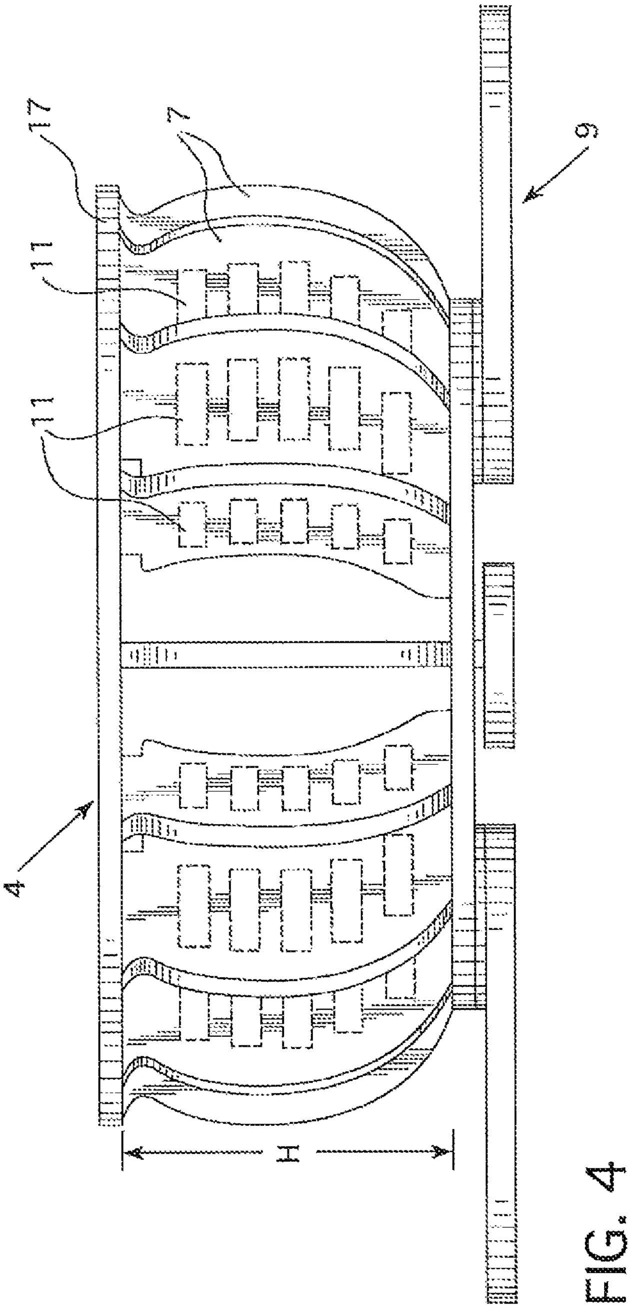
FIG. 4 is a side view of the first exemplary embodiment of the stator.
Figure 5:
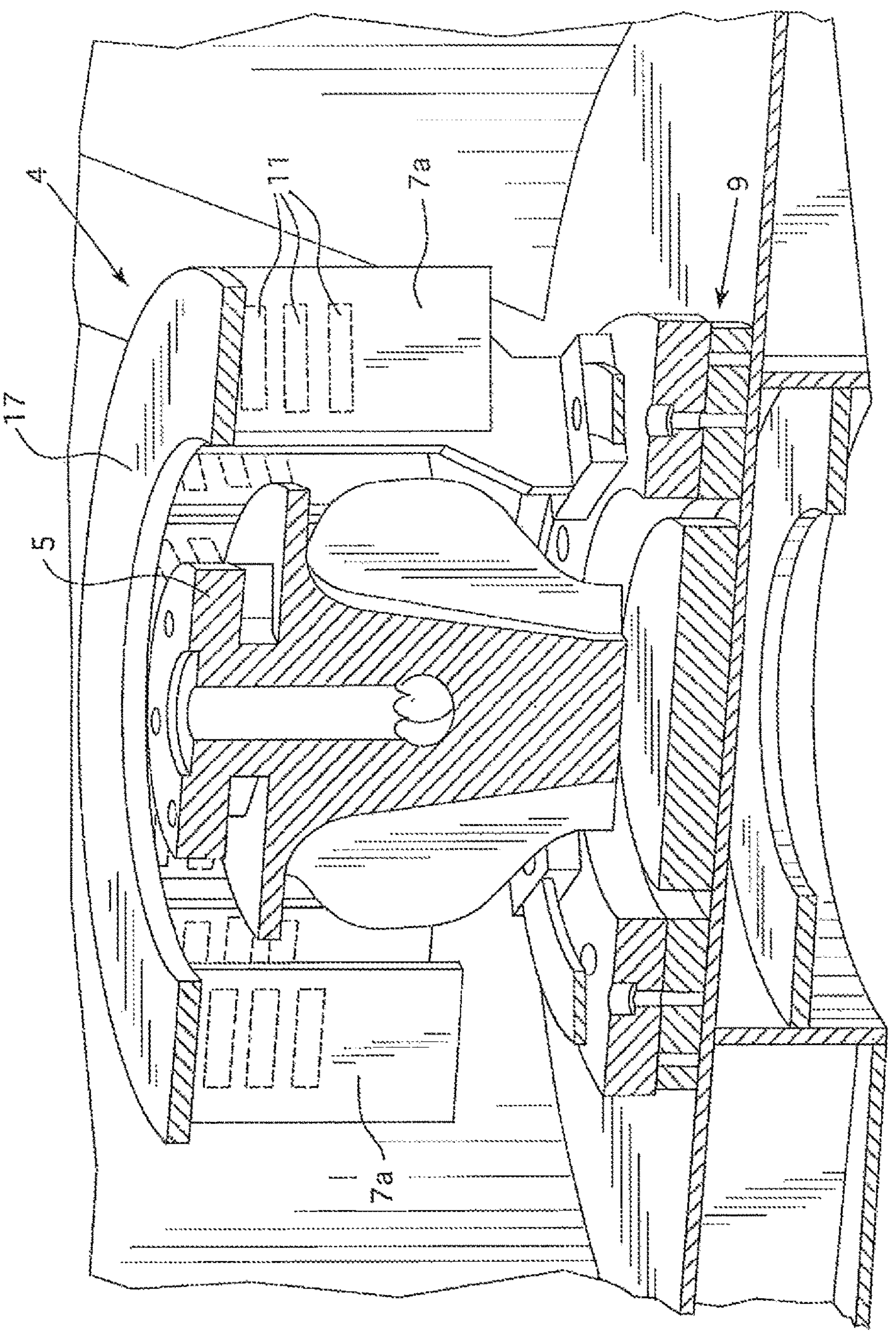
FIG. 5 is a cross sectional view similar to the view of FIG. 2 illustrating a second exemplary embodiment of the stator.
Figure 10:
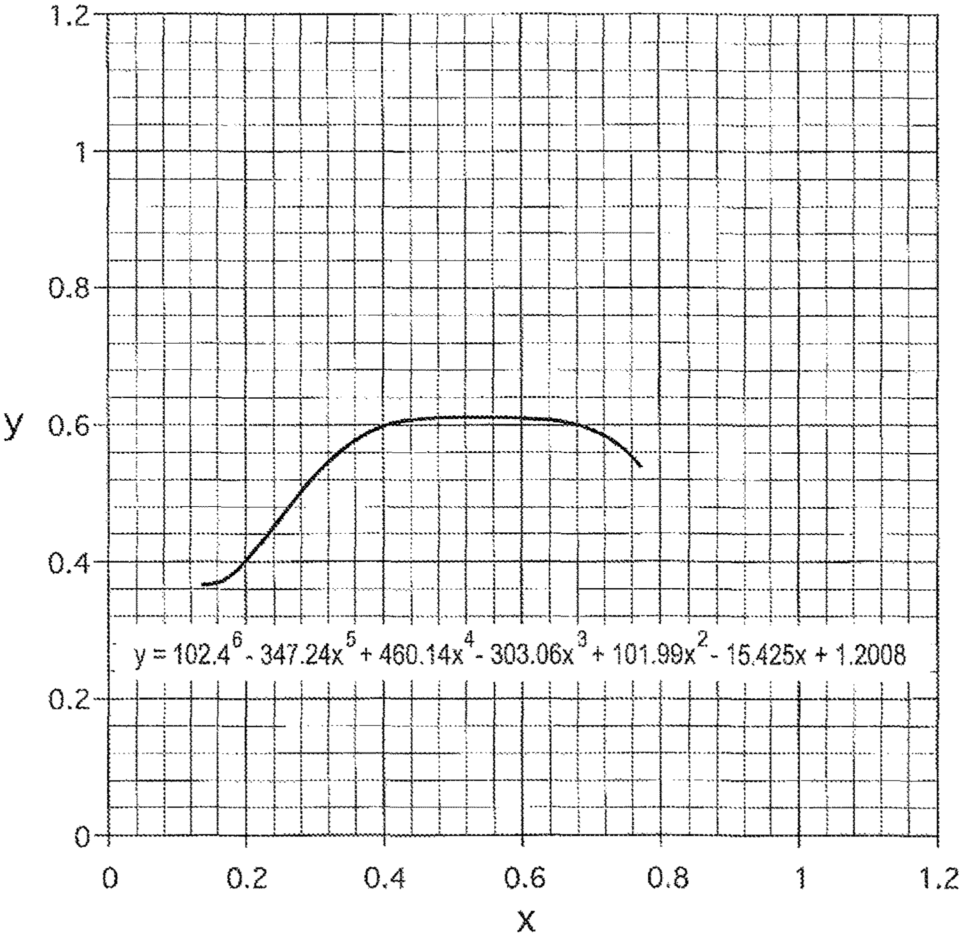
FIG. 10 is a graph illustrating a curvature of an inner side of an exemplary embodiment of a vane that may be utilized in embodiments of the stator.

The vanes 7 may have any of a number of shapes. For instance, as shown in FIGS. 1-3, the vanes 7 may be configured to be curved or bowed in shape. An inner side of the vanes adjacent a central opening defined by the vanes 7 may be curved similarly to a half-circle arc or a parabolic curve and may bow outwardly away from the central opening defined by the stator 4. As may be appreciated from FIG. 10, the curve of the inner edge of the vanes 7 that is adjacent to the central opening defined by the vanes 7 is a curved wall that extends along a curve defined by the formula $y=102.4*x^6-347.24*x^5+460.14*x^4-303.06*x^3+101.99*x^2-5.425*x+1.2008$, where x is the width of the vane and y is the height of the vane and x has a value of between 0.136 to 0.771 and the formula is in normalized form based on the radius R of the stator 4. It should be understood that the radius R is the maximum width of the stator from the center of the central opening defined by the stator to the outermost point of the outer side of a vane 7.

Figure 11:
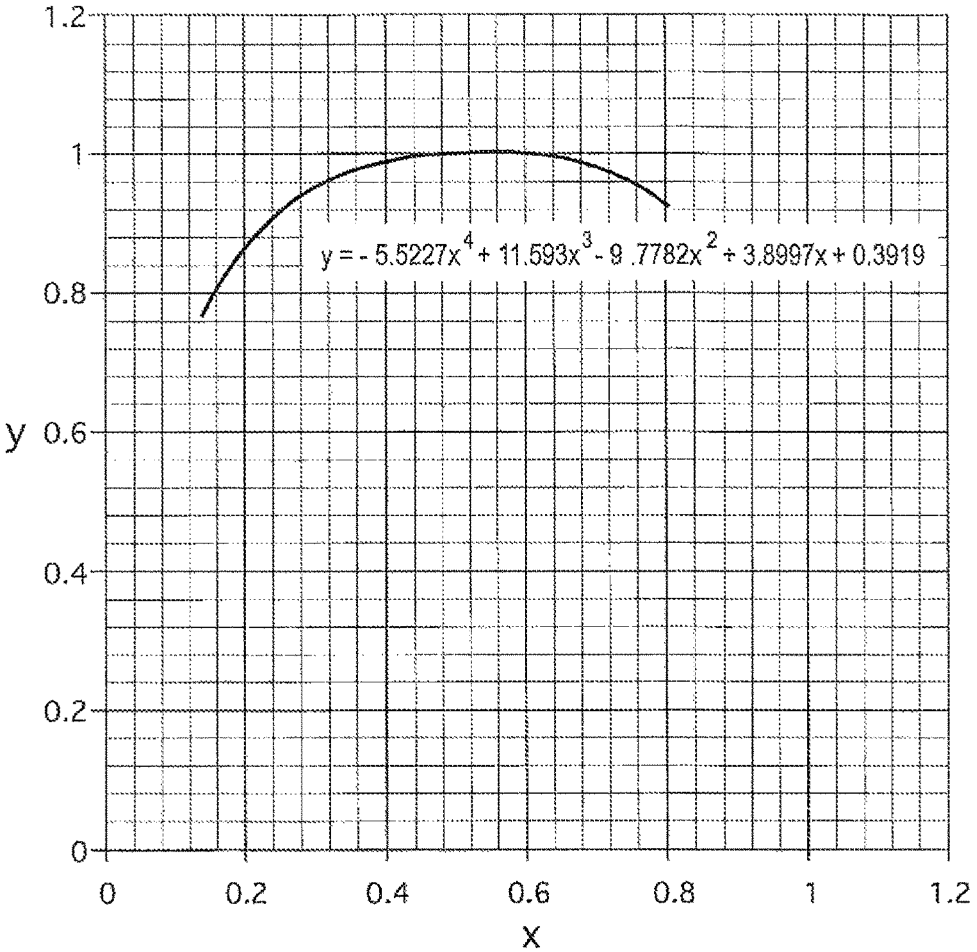
FIG. 11 is a graph illustrating a curvature of an outer side of an exemplary embodiment of a vane that may be utilized in embodiments of the stator.

The side of the vanes on an outer side that is opposite the inner side of the vanes may be bowed outwardly such that the shapes or profiles of the inner side and outer side of each vane 7 are different. For example, as may be appreciated from FIG. 11, the outer edge of each vane 7 may be a curved structure that extends along a curve defined by the formula $y=-5.5227*x^4+11.593*x^3-9.7782*x^2+3.8897*x+0.3919$, where the formula is in normalized form to account for the maximum radius R of the stator 4 and x is the width of the vane and y is the vertical height of the vane and x has a value of between 0.136 to 0.794. As noted above with reference to the inner side of the vane 7, it should be understood that the radius R is the maximum width of the stator from the center of the central opening defined by the stator to the outermost point of the outer side of a vane 7.

In one configuration, the inner side and outer side shapes of the vanes may be configured so that the shape of each vane corresponds with the shape of a rotor blade. For instance, the inner and outer sides of the vanes 7 may be shaped to have a parabolic curved profile that corresponds with a curvature of a rotor blade or correspond to a substantial portion of a curved profile of such a blade. One example of such a shape correspondence may be appreciated from FIG. 2, which illustrates vanes 7 corresponding in shape with the blades of the rotor 5.

As yet other alternative vane configurations, each vane may be a rod, generally cylindrical beam, or a bar. For instance, the vanes may be rectangular or polygonal in shape and have the same shape on opposite inner and outer sides as may be appreciated from the stator designs shown in FIG. 5, FIG. 6 and FIG. 6A. Vanes 7*a* may be rectangular shaped and only include slots on an upper half of each vane 7*a* for example. Vanes 7*b* of the stator shown in FIG. 6 may be polygonal in shape and be configured to extend in a vertical direction that extends at an angle that is less then perfectly vertical so that the vanes 7*b* are angled to accommodate a shape of a rotor within the central opening defined by the stator 4. The vanes 7*c* of the stator 4 shown in FIG. 6A may be rectangular in shape with straight outer and inner sides and not include any slots. In yet other embodiments, the vanes may be generally cylindrical in shape, be rods, bars, plates, or be other types of shaped members.

Figure 6:
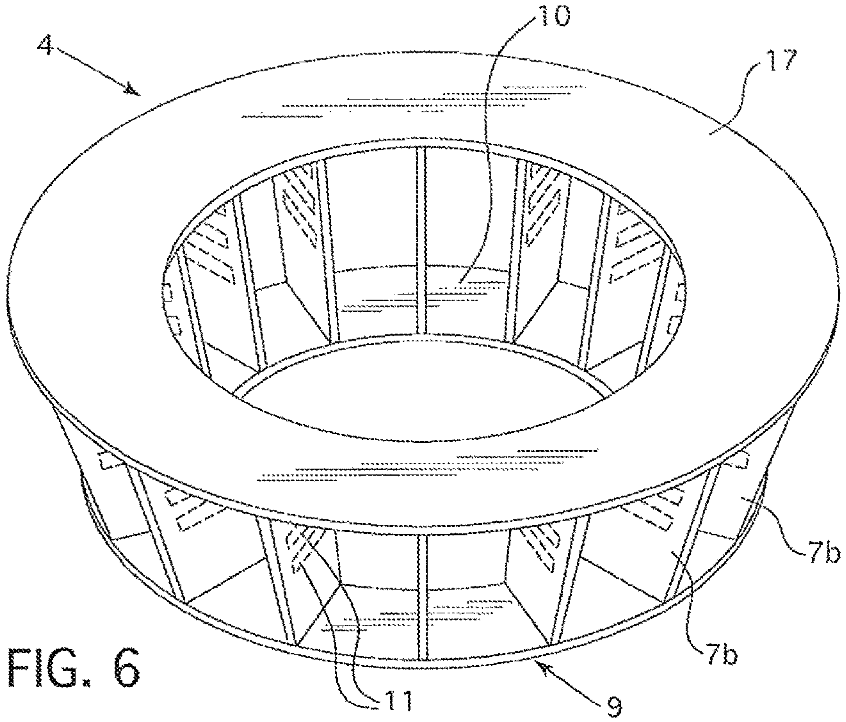
FIG. 6 is a perspective view of a third exemplary embodiment of the stator.
Figure 6A:
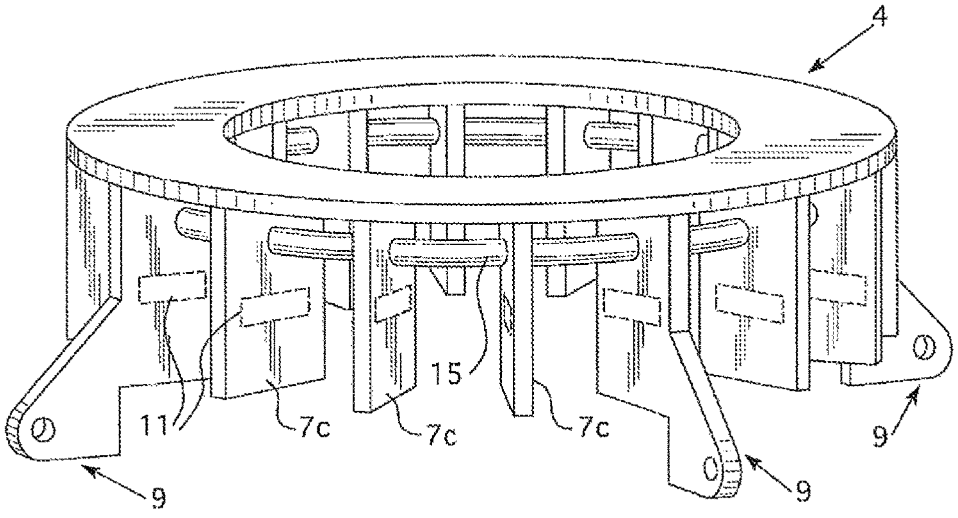
FIG. 6A is a perspective view of a fourth exemplary embodiment of the stator.

In some embodiment of the stator 4, a ring 15 or other annular member such as a polygonal shaped annular member may be attached to each of the vanes between the top and bottom of the vanes. Such a member may help divert flow of fluid and reduce pitting that could occur due to a turbulence profile created by a rotating rotor within the central opening 10 of the stator 4. One example of such a ring 15 is shown in broken line in FIG. 3. Another example of such a ring is shown in FIG. 6A. The ring 15 may be attached to and extend through each vane of the stator to encircle the opening defined within the stator by the blades and other structure of the stator. The ring 15 may also be positioned to correspond with a vertical position of the outlets 29 of a rotor through which a gas such as air is emitted. The ring 15 may be positioned to divert the flow of air emitted from the rotor to help generate bubbles.

Figure 7:
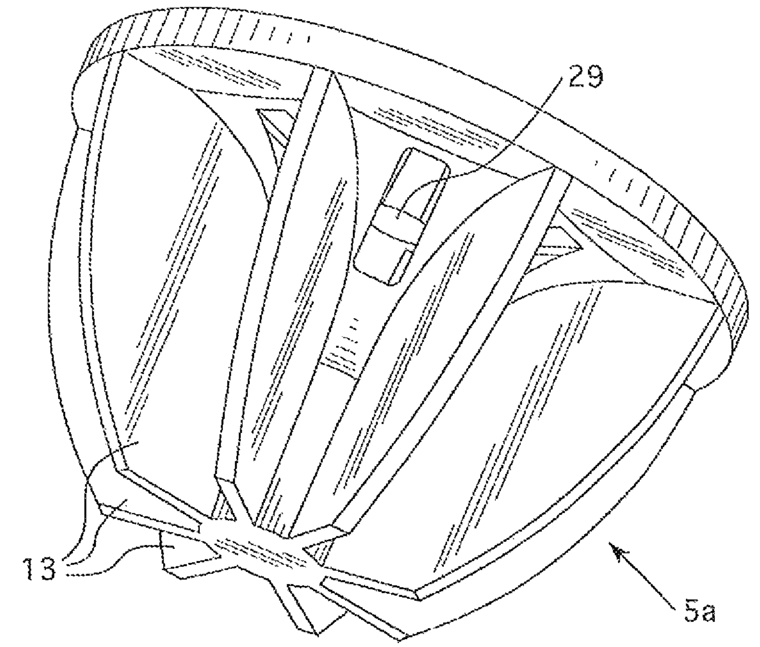
FIG. 7 is a perspective view of a first exemplary embodiment of a rotor that may be utilized in embodiments of the flotation machine.
Figure 8:
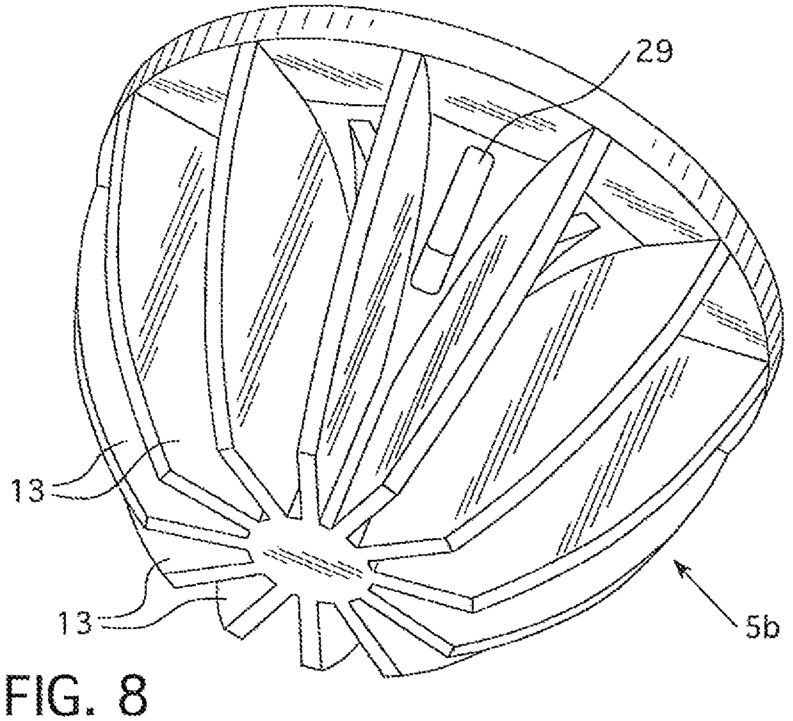
FIG. 8 is a perspective view of a second exemplary embodiment of a rotor that may be utilized in embodiments of the flotation machine.

The rotor 5 may be a rotor having any number of blades such as six blades, eight blades, twelve blades, sixteen blades or any other number of blades. In one embodiment, the rotor is configured to have at least eight blades 13. For instance, the rotor may have eight blades as shown in the rotor 5 of FIGS. 1-2 and the rotor 5*a* of FIG. 7 or twelve blades as shown in the rotor 5*b* of FIG. 8. It should be understood that the rotor of the flotation machine may be sized for positioning within the central opening 10 of an embodiment of the stator 4.

It should be understood that the blades of the rotor may have any of a number of different shapes or configurations. For example, some embodiments of the rotor 5 may be configured to be similar in construction to the rotors disclosed in U.S. patent application Ser. No. 13/535,566 while other embodiments may utilize different rotor designs, such as the rotor design disclosed in U.S. Pat. No. 4,425,232. The entirety of U.S. patent application Ser. No. 13/535,566 is incorporated by reference herein. Of course, the blades of the rotor 5 may have any of a number of other shapes to meet a particular design objective.

The rotor may have an inner passageway and orifices to receive a gas such as air passed through a drive shaft or other conduit for emitting air within the slurry retained in the tank. The emitted air may then be agitated by the rotation of the rotor, which rotates the blades 13 of the rotor.

Air may also be fed to passageways formed in the stator and emitted out one or more orifices formed in the stator. For instance, there may be outlets defined in the top member 17 of the stator that emits air or other type of gas such as nitrogen gas or carbon dioxide gas fed to the stator via a conduit formed in a portion of the drive system or other conduit for feeding air to the rotor, stator, or both the rotor and the stator. Passageways may be defined within the top member 17 so that the outlets formed in the top member are in communication with such a conduit. In addition to or as an alternative to having orifices within the top member for emitting air, outlets may instead be defined in the vanes so that air is emitted into the space between adjacent blades. For instance, an outlet 21 as shown in broken line in FIGS. 2 and 3 may be formed in one or more vanes 7 for emitting air or another gas into the gap defined between immediately adjacent vanes. A passageway for feeding the air or other gas may be defined within the vane and other parts of the stator such as the top member 17 or the base 9 to convey the air from a conduit used to distribute the air to the stator 4 for emission within the gaps between immediately adjacent vanes 7. As yet another example, the base 9 of the stator 4 may have one or more outlets for emitting air or another gas into the tank. The outlets of the base 9 of the stator 4 may be positioned between immediately adjacent vanes, for example.

Figure 9:
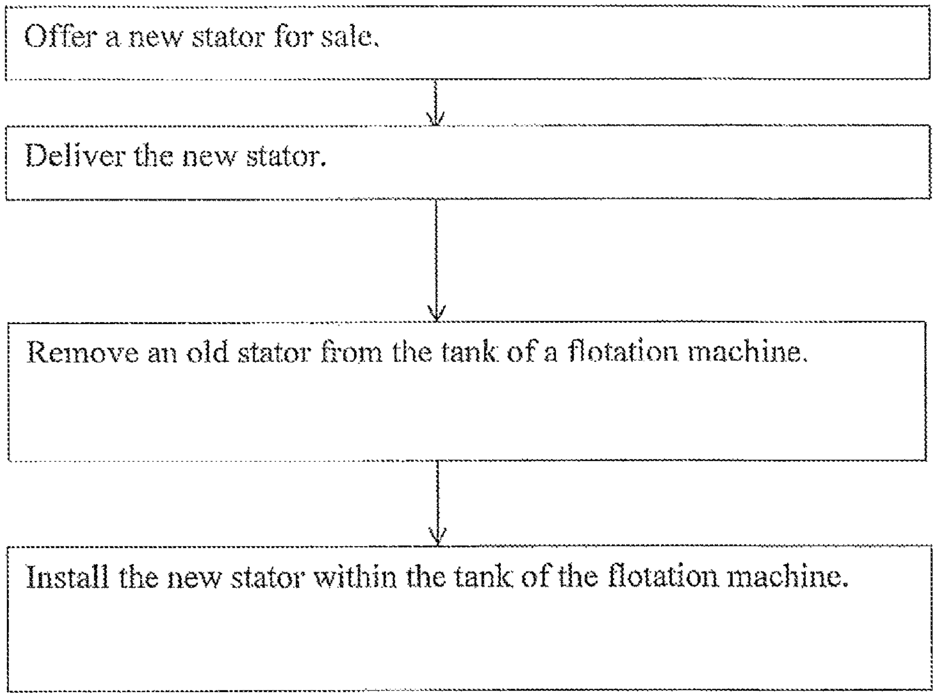
FIG. 9 is a flow chart illustrating an exemplary method that may be utilized to retrofit a flotation machine with an embodiment of the stator.

A method of retrofitting a flotation machine with an embodiment of the stator such as an above discussed embodiment of the stator 4 may include the steps of offering the stator for sale to a mineral extraction or mineral production entity may be appreciated from FIG. 9. One or more of the stators 4 may be offered for sale to replace at least one pre-existing stator or at least one damaged stator. The offered one or more stators may then be sold and installed in one or more cells of a flotation machine owned by that customer. The installation or retrofitting of the flotation machine may include removing an old preexisting stator prior to installing a new stator within a tank of a flotation machine. The installation work may be done by the entity offering the new stator or may be performed by an agent of the entity offering the new stator. The installation work may also include initial work done to ensure the stator is properly installed upon a start-up of the flotation machine after installation of the stator is complete. The installation work may not be considered to be complete until after a customer approves of the installed new stator in some embodiments of the method. In yet other embodiments of the method, the customer may install the new stator at the direction of the stator 4 manufacturer or seller of the stator 4 as an agent of the seller or manufacturer to ensure the sale of the stator 4 and installation of the stator 4 meets with the customer's satisfaction.

Embodiments of the stator 4 were tested to investigate whether the stator 4 could significantly improve mineral recovery or reduce the amount of energy required to power the rotor to agitate the slurry at a desired level. The research included testing and computational fluid dynamic analyses. The conducted research showed that the use of embodiments of the stator can improve mineral recovery by about 5% and also lower specific energy consumption by 1% as compared to a conventional stator. Stators that had multiple vanes containing elongated rectangular slots 11 were found to provide a significant increase in mineral recovery and lower specific energy consumption during the testing. For instance, a stator having eight vanes with multiple elongated rectangular slots 11 was found to improve mineral recovery by 1.1% to 1.6% and reduce the specific energy needed for agitation of the slurry. As another example, a stator having sixteen vanes that each had multiple elongated slots was found to improve mineral recovery by 4.4% in combination with use of a conventional rotor disclosed in U.S. Pat. No. 4,425,232.

In one investigation of a stator design utilizing sixteen vanes having elongated rectangular shaped slots that were elongated along the widths of the vanes, it was determined that coarse particle recovery for coarse particles of a size range from 150-300 micrometers was improved. In another investigation performed via computational fluid dynamics modeling, it was shown that a higher attachment rate and more uniform turbulence energy dissipation could be provided by embodiments of the stators having sixteen slotted vanes that were each shaped as flat rectangular vanes for coarse particle recovery of particles sized between 150-300 micrometers. Use of such a stator having sixteen vanes with elongated slots was also found to produce much finer bubbles then other stator designs. For example, it was determine that the bubble size could be reduced from 1.7 mm to 0.7 mm by use of an embodiment of the stator 4 having sixteen rectangular shaped blades with multiple rectangular slots 11 formed therein that were elongated along the width of the vanes. The smaller bubble sizes help improve attachment rate and provide a more efficient use of energy utilized by the agitation system of a flotation machine for causing a froth to be formed.

Figure 12:
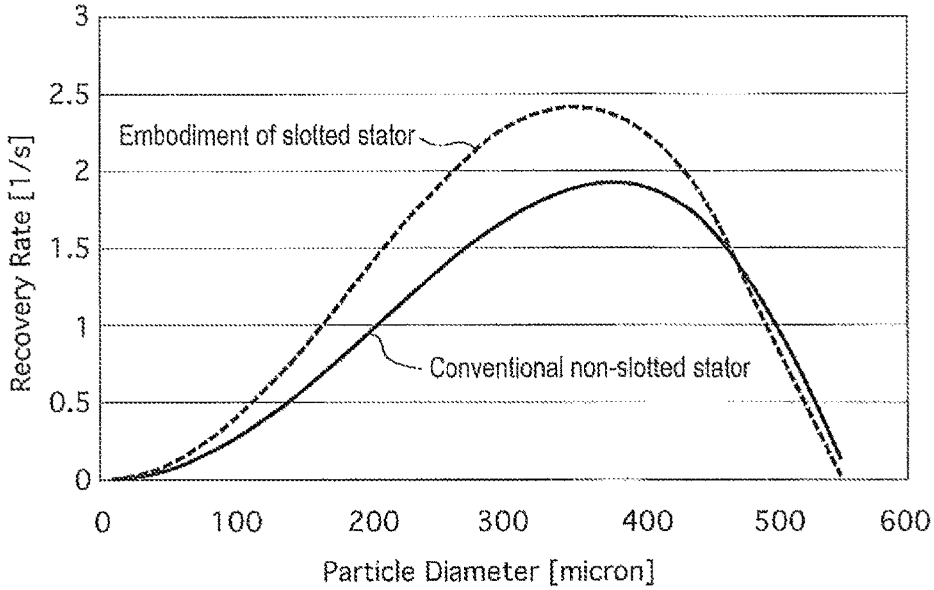
FIG. 12 is a graph illustrating an improved performance for mineral recovery that an embodiment of our stator may provide relative to a conventional stator.

As yet another example, FIG. 12 is a graph illustrating results obtained from an investigation performed via computational fluid dynamics modeling that compared a conventional stator to an embodiment of our stator that included elongated slots. As can be seen from the graph of FIG. 12, the embodiment of our stator provided a substantial increase in recovery rate for particles having a diameter of between 100 microns to about 450 microns.

As those of at least ordinary skill in the art will appreciate, a mineral recovery improvement of between about 1% and about 5% as noted above is a substantial improvement over conventional designs and equates with millions of dollars' worth of improved mineral recovery for each year of operation of a bank of flotation machines. For example, a smaller concentrator (e.g. recovers 40,000-50,000 tons of mineral per day) that improves recovery by 1% of copper may increase revenue by $8,000,000 for a bank of flotation machines in one year of operations. A larger concentrator such as a concentrator that recovers between 150,000 tons to 160,000 tons of mineral per day may experience in increase of $25,000,000 or more per year from such a 1% increase in recovery. Additionally, the reduction in energy usage of at least 1% is also considerably significant and can help reduce the operation costs associated with flotation machine operations.

It should be understood that different variations to the above mentioned embodiments of the flotation machine, stator, and rotor may be made to meet different design objectives. For example, the vanes of the stator may be arranged in any of a number of ways and have any of a number of shapes. As yet another example, at least some of the slots formed in each vane may be elongated along the height of the vane instead of the width of the vane. As another example, air or another gas may be passed through just the rotor, just the stator, or both the stator and the rotor to facilitate the formation of a froth above the slurry retained within the tank of the flotation machine. As yet another example, the stator may be composed of any of a number of different materials to meet a desired design objective.

As yet another example, the tank of the flotation machine may have any of a number of shapes or sizes. For instance, the shape and geometry of the tanks of the flotation cells may be any of a number of different shapes and sizes. The type of material to be recovered by a flotation machine may be any of a number of different minerals or metals such as, for example, copper, iron, coal, a base metal, a special metal, other minerals or other types of metal. As yet another example and as those of at least ordinary skill in the art will appreciate, the types of reagents, types of depressants/activators, use of different pH levels, use of different collectors, frothers, or modifiers may be utilized as needed to meet different material recovery objectives, or other design objectives. Of course, yet other modifications to the embodiments discussed above may be made to meet any of a number of design criteria that may be set or requested by a flotation machine operator for recovery of a material from a slurry retained within a tank of a flotation machine as may be appreciated by those of at least ordinary skill in the art.

While certain present preferred embodiments of a flotation machine, a stator, a rotor, and methods of making and using the same have been shown and described above, it is to be distinctly understood that the invention is not limited thereto but may be otherwise variously embodied and practiced within the scope of the following claims.

The invention claimed is:

1. A flotation machine comprising:

a tank sized to retain a slurry;

a rotor having openings through which at least one gas is emitted; and, a stator positioned in the tank adjacent the rotor, the stator having a plurality of vanes, each of the vanes having a plurality of slots formed therein; each of the vanes having a height (H) extending in an axial direction of the stator, a width (W) extending in a radial direction (R) of the stator, and a thickness which is transverse to said radial direction (R); each of the slots having a shape that is elongated in the radial direction (R) along the width (W) of its respective vane, each of the vanes of the stator being spaced apart from the other vanes to which that vane is adjacent, the vanes being positioned in series adjacent a periphery of the stator to define a central opening within the stator which is configured to receive the rotor, each vane extending radially with respect to a center of the stator; the rotor being positioned in the central opening, the rotor being rotatable within the central opening of the stator;

wherein upper portions of the vanes are supported by a top member which is annular and connected to the vanes, and wherein lower portions of the vanes are supported by a base which is connected to the vanes wherein an outer diameter or inner diameter of the top member is different than a respective outer diameter or inner diameter of the base.

2. The flotation machine of claim 1, wherein the stator is further comprised of a ring shaped or annular member positioned between the top member and base that passes through each of the vanes and is connected to the vanes such that the member is aligned with the openings of the rotor.

3. The flotation machine of claim 2, wherein the ring shaped or annular member is positioned to correspond with a vertical position of the openings of the rotor to divert a flow of the at least one gas emitted via the openings of the rotor to facilitate bubble generation within the slurry.

4. The flotation machine of claim 1, wherein the rotor has at least eight blades and wherein the vanes of the stator are comprised of at least eight vanes.

5. The flotation machine of claim 1, wherein the slots are all positioned in upper halves of the vanes.

6. The flotation machine of claim 1, wherein each of the vanes is shaped to complement a shape of a blade of the rotor.

7. The flotation machine of claim 1, wherein each of the vanes is bowed, curved, diagonal, or tapered.

8. The flotation machine of claim 1, wherein each of the vanes has an inner side adjacent the central opening and an outer side positioned opposite the inner side, the width of the vane extending between the inner and outer sides of the vane, the inner side of the vane comprising a different profile than the outer side of the vane.

9. The flotation machine of claim 1, wherein each of the slots is rectangular in shape.

* * * * *